United States Patent
Lub et al.

(10) Patent No.: US 8,518,299 B2
(45) Date of Patent: Aug. 27, 2013

(54) DICHROIC GUEST-HOST POLARIZER COMPRISING AN ORIENTED POLYMER FILM

(75) Inventors: Johan Lub, Eindhoven (NL); Emiel Peeters, Eindhoven (NL); Dirk Jan Broer, Eindhoven (NL)

(73) Assignee: Sumitomo Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/830,140

(22) Filed: Jul. 2, 2010

(65) Prior Publication Data

US 2010/0267858 A1 Oct. 21, 2010

Related U.S. Application Data

(62) Division of application No. 10/578,062, filed as application No. PCT/IB2004/052257 on Nov. 2, 2004, now Pat. No. 7,763,330.

(30) Foreign Application Priority Data

Nov. 6, 2003 (EP) ..................... 03104099

(51) Int. Cl.
*C09K 19/20* (2006.01)
(52) U.S. Cl.
USPC .............. 252/299.67; 252/299.01; 252/299.6; 522/108
(58) Field of Classification Search
USPC ......... 428/1.33; 252/299.01, 299.61–299.67; 522/108
See application file for complete search history.

(56) References Cited

U.S. PATENT DOCUMENTS

| 5,024,850 | A | 6/1991 | Broer et al. |
| 5,041,602 | A | 8/1991 | Nagai et al. |
| 5,738,918 | A | 4/1998 | Shen et al. |
| 5,739,296 | A | 4/1998 | Gvon et al. |
| 5,751,389 | A | 5/1998 | Andreatta et al. |
| 5,871,665 | A * | 2/1999 | Coates et al. ............ 252/299.01 |
| 5,875,014 | A | 2/1999 | Kuwabara et al. |
| 5,958,291 | A | 9/1999 | Naito et al. |
| 6,174,394 | B1 | 1/2001 | Gvon et al. |

(Continued)

FOREIGN PATENT DOCUMENTS

| DE | 4405316 A1 * | 8/1995 |
| EP | 0 346 911 | 12/1989 |

(Continued)

OTHER PUBLICATIONS

EPO Website Machine English Translation of DE 4405316 A1, Delavier et al., Aug. 24, 1995.*

(Continued)

*Primary Examiner* — Erik Kashnikow
*Assistant Examiner* — Eli D Strah
(74) *Attorney, Agent, or Firm* — Birch, Stewart, Kolasch & Birch, LLP (57) ABSTRACT

A dichroic guest-host polarizer comprises an oriented polymerized liquid crystal host and aligned therewith a dichroic guest. The dichroic ratio of the polarizer is about 15 or more. The polarizer may have a small thickness, be manufactured using a wet deposition method, optionally in accordance with a desired pattern, and be provided on the inside of a liquid crystal cell. Polymerizable liquid crystals having a highly ordered mesophase which may be suitable used to obtain highly oriented polymer films such as polarizer films are disclosed.

3 Claims, 3 Drawing Sheets

(56) References Cited

U.S. PATENT DOCUMENTS

| | | |
|---|---|---|
| 6,245,399 B1 | 6/2001 | Sahouani et al. |
| 6,529,253 B1 | 3/2003 | Matsute |
| 6,767,594 B1 | 7/2004 | Miroshin et al. |
| 6,924,861 B2 * | 8/2005 | Hammond-Smith et al. 349/129 |
| 7,248,331 B2 | 7/2007 | Miyatake et al. |
| 2001/0035520 A1 * | 11/2001 | Takeuchi et al. ......... 252/299.67 |
| 2002/0060310 A1 * | 5/2002 | Hasebe et al. ............ 252/299.64 |
| 2003/0025104 A1 * | 2/2003 | Obi et al. ................. 252/299.01 |
| 2003/0085377 A1 * | 5/2003 | Dunn et al. .............. 252/299.01 |
| 2003/0178609 A1 | 9/2003 | Hammond-Smith et al. |
| 2006/0007371 A1 | 1/2006 | Miyatake et al. |
| 2007/0195243 A1 | 8/2007 | Miyatake et al. |
| 2007/0195244 A1 | 8/2007 | Miyatake et al. |
| 2007/0202273 A1 | 8/2007 | Hirai et al. |
| 2007/0206282 A1 | 9/2007 | Miyatake et al. |
| 2007/0279741 A1 | 12/2007 | Yoshioka et al. |
| 2008/0152843 A1 | 6/2008 | Kato et al. |
| 2008/0220339 A1 | 9/2008 | Zakrevskyy et al. |
| 2008/0231793 A1 | 9/2008 | Futamura et al. |
| 2008/0252974 A1 | 10/2008 | Futamura et al. |

FOREIGN PATENT DOCUMENTS

| | | |
|---|---|---|
| EP | 0 739 884 | 10/1996 |
| EP | 806697 | 11/1997 |
| EP | 0961138 A1 | 12/1999 |
| WO | WO 03/006574 | 1/2003 |

OTHER PUBLICATIONS

Hsu, Chain-Shu, Her, Bin-Sheng, Synthesis of ferroelectric liquid crystalline polymethacrylates containing 1,2-diphenylethane based mesogens, 1996, Macromol. Chem. Phys., 197, 4105-4118.*
European Search Report issued in EP application No. 09172409.6 on Jan. 27, 2010.
Lub, J. et al., "Synthesis and Properties of Chiral Stilbene Diacrylates" Liquid Crystals, Taylor and Francis, Abindon, GB, vol. 30, No. 10 (Oct. 1, 2003) pp. 1207-1218, XP001170868.
Lub, J. et al., "The Synthesis of Liquid-Crystalline Diacrylates Derived from Cyclohexane Unites", Recueil Des Travaus Chimiques Des Pays-Bas, Elsevier Science Publishers, Amsterdam, NL, vol. 115, (Jun. 6, 1996) pp. 321-328, XP008042798.
Office Action mailed Jun. 22, 2009 in corresponding European Application No. 04770349.1.
Taiwanese Office Action Report dated May 27, 2011.

* cited by examiner

DICHROIC GUEST-HOST POLARIZER COMPRISING AN ORIENTED POLYMER FILM

This application is a Divisional of application Ser. No. 10/578,062 filed on May 2, 2006, now U.S. Pat. No. 7,763,330 which is a 371 of PCT International Application No. PCT/IB04/52257 filed on Nov. 2, 2004, which claims priority on European Application No. 03104099.1 filed on Nov. 6, 2003. The entire contents of each of these applications is hereby incorporated by reference.

The invention relates to a dichroic guest-host polarizer comprising an oriented polymer film.

The invention also relates to polymerizable liquid crystal compounds for use in an oriented polymer film.

The invention further relates to a method of manufacturing a dichroic guest-host polarizer comprising an oriented polymer film.

Polarizers in the form of a film, also known as sheet polarizers, are widely used in the art to manipulate or produce beams of polarized light. Because of its excellent optical performance and low cost, a H-sheet polarizer is most widely used in liquid crystal display (LCD) devices. The H-sheet polarizer is a dichroic guest-host polarizer which provides linearly polarized light. Linear polarization is achieved by a uniaxially stretched poly(vinylalcohol) film impregnated with iodine or some other dichroic colorant. To avoid degradation of optical performance by ingress of moisture and relaxation of the polymer, the poly(vinylalcohol) is typically sandwiched between triacetylcellulose foils. The polarizer typically also includes an adhesive layer to adhere the polarizer to the LCD, leading to a thickness of the polarizer of about 70 to 150 µm. This is relatively thick, at least much too thick to be able to use the H-sheet polarizer conveniently on the inside of a liquid crystal cell.

There is a need in the art for polarizers which are capable of bringing a polarization selectivity which meets or even exceeds that of the H-sheet polarizer but which are much thinner than the H-sheet polarizer. A further need exists for polarizers which can be conveniently applied on the inside of a liquid crystal cell.

It is an object of the invention, inter alia, to provide a very thin dichroic guest-host polarizer, very thin meaning a thickness less than about 10 µm, more particular about 5 µm or less, while being capable of meeting optical performance requirements needed for use in a large variety of liquid crystal displays such a liquid crystal television sets. If such is desired, the polarizer is to be applicable conveniently on the inside of a liquid crystal cell.

These and other objects are achieved by a dichroic guest-host polarizer comprising an oriented polymer film including an oriented polymerized liquid crystal host and a dichroic light-absorbing guest dispersed and oriented in the host, the oriented polymer film having a dichroic ratio of about 15 or more.

The polarizer in accordance with the invention provides linearly polarized light. It operates by selectively absorbing one polarization state from an unpolarized light beam while transmitting the polarization state complementary thereto. The direction along which absorption takes places is referred to as the extinction axis of the polarizer; the direction along which light is substantially transmitted, which is light of the complementary polarization state, is referred to as the transmission axis.

Polarization-selective absorption is achieved by means of a dichroic guest which is oriented in the host.

In the context of the invention, the term "oriented", and mutates mutandis related terms such as "orientation", means "anisotropically oriented" and is synonymous to "aligned". "Oriented" ("aligned") means that the matter of which the object to which it refers is formed has a long-range orientational order in the form of a mono-domain (or a plurality of mono-domains laid out in accordance with a desired pattern) as opposed to a random multi-domain structure, rendering the properties, such as the optical properties, of the object directionally dependent in a controlled and desired manner.

Orientation of the dichroic guest is facilitated by means of the polymerized liquid crystal host. The polymerized liquid crystal host is aligned and the dichroic guest is aligned with the host.

In the context of the present invention, the term "polymerized liquid crystal" means a polymer which is or can be brought into an oriented state which oriented state is or is derived from a mesophase of a liquid crystal. A "liquid crystal polymer" is a specific type of polymerized liquid crystal, it is a polymer and a liquid crystal. In general, a polymerized liquid crystal need not be itself a liquid crystal. It is sufficient that when provided in an oriented state, the state derives from or is commensurate with a liquid crystal mesophase. Such compounds are accessible by polymerizing a liquid crystal in a mesophase. Upon polymerization the mesophase is immobilized and the orientation fixed.

The term "polymerized liquid crystal" generally means any polymerized liquid crystal neat or any composition including such a polymerized liquid crystal such as compositions and mixtures comprising a plurality of different polymerized liquid crystals The term "polymer" or its derivatives such as "polymerized" includes any more specific type of polymer such as oligomers, homopolymers, copolymers, terpolymers and higher homologues, crosslinked polymers, network polymers and linear polymers, and in particular polymer liquid crystals obtained form a mixture of liquid crystal monomers.

The inventors have observed that polymerized liquid crystal hosts can be suitably used to obtain an oriented polymer film having a degree of order sufficiently high for providing very thin polarizers which meet optical performance requirements of an LCD. More in particular, the inventors have observed by means of polymerized liquid crystals in which dichroic guests are dispersed, oriented films can be obtained which have a dichroic ratio of about 15 or more. A dichroic ratio of about 20 or more or even about 25 or more is readily achieved. Dichroic ratios of about 30 or more, or about 40 or even about 50 or more can be achieved.

In the context of the present invention, dichroic ratio means dichroic ratio in absorbance and is defined as the ratio of the absorbance (measured at normal incidence) along the extinction axis and the absorbance along the transmission axis where absorbance (A) is defined as $A = -\log_{10} T$ where T is transmission. U.S. Pat. No. 5,738,918 discloses laminates comprising a polarizer film comprising a liquid crystal polyester and a dichroic dye. However, the laminate is relatively thick because it comprises a number of films. Further the dichroic ratio is only about 8 making the polarizer relatively unsuitable for demanding LCD applications such as LCD TV.

Having the capability of providing oriented films capable of providing a dichroic ratio of about 30 or more or about 40 more, polarizers having a thickness of about 5 µm or less can be formed which are suitable for use in demanding LCD applications such as LCD monitors or LCD TV.

The host may be suitably formed of a liquid crystal polymer such polymers being known in the art as such. In order to be suitable such polymers need to have a highly ordered mesophase at room temperature and a $T_g$ which is above room temperature to substantially maintain the orientation when ambient temperature varies.

If the host is obtained by polymerizing an oriented polymerizable liquid crystal, the requirements are less demanding. For example, the temperature at which the highly ordered mesophase occurs is basically irrelevant and there is no requirement of $T_g$ being above room temperature. In a preferred embodiment of the polarizer therefore, the oriented polymerized liquid crystal host is obtained by polymerizing an oriented polymerizable liquid crystal.

Highly ordered phases are very effective in providing oriented films having dichroic ratios of about 15 or more. The inventors have found smectic phases to be useful source of highly ordered phases. Thus, in a particular embodiment of the polarizer in accordance with the invention, the orientation of the oriented film is or corresponds to the orientation of a smectic phase $S_X$ wherein X is not A or C.

Particularly suitable for use in polarizers, is the smectic phase B or tilted variants thereof, that is the smectic F and I phase. In the context of the present invention, and in accordance with the classification of mesophases used in some prior art references, "soft crystal" phases are also considered smectic phases. In particular, crystal B and its tilted versions, crystal G and J, and crystal E and tilted versions thereof, that is crystal H and K, can also be used for the polarizers. The suitable mesophases have in common the presence of a long-range orientational order.

Nematic phases are generally less suitable providing dichroic ratios of about 8 or less, whereas smectic A phases provide a dichroic ratio of less than 12. The smectic C phase, is a tilted variant of the smectic A phase and thus also generally unsuitable. Moreover, generally, tilt in directions which make an angle with the plane of transmission and extinction axis adversely affects the dichroic ratio.

The polarizer can be easily manufactured to be very thin (for example thickness less than about 10 µm or even less than about 5 µm) because the polymerized liquid crystal host can be obtained as a thin film, the thin film being obtainable by means of a conventional thin-film forming method such as a coating or a printing method or by filling a cell normally used to accommodate liquid crystal for liquid crystal displays.

Although the thin-film polarizer can in principle have any thickness, in general a thickness less than the thickness of a conventional H-sheet polarizer is preferred, that is a thickness of about 50 µm or less, more particularly 30 µm or less or preferably about 10 µm or less. Preferably, the thickness is less than about 5 µm.

In principle any dichroic guest may be used; it may be a dye or a pigment, it may be dispersed on a molecular scale or dispersed as light absorbing particles. The color of the dichroic guest is selected with a view to the application. Typically, absorption is to be achieved in the visible range of the spectrum, 400 to 700 nm. This may be achieved by using suitable black dichroic colorants, or by suitable combinations of colorants, such as red, green and blue. If a combination of dichroic colorants is used such colorants may be dispersed within a single layer or may be accommodated in a stack of layers where layers in the stack comprise mutually different colorants. The dispersion of a colorant or combination of colorants may also vary laterally within the polarizer such as would be the case in red, green and blue polarizing color filter. The variation of dichroic colorant or colorants may be a variation in concentration and/or orientation of the transmission axis.

In a preferred embodiment of the invention the dichroic light-absorbing guest is a blue absorbing dichroic colorant and the polarizer further comprises a thin film obtained from a lyotropic liquid crystal such as a perylene-based, a naphthalene-based or an anthraquinone-based lyotropic liquid crystal or combination thereof.

Polarizers obtained from perylene-based, naphthalene based and anthraquinone based lyotropic liquid crystalline dyes are known in the art as such. See for example U.S. Pat. No. 6,049,428. These non-polymeric liquid crystals can be deposited and oriented easily in very thin films using coating methods. The films so obtained have a thickness of less than 1 µm and polarize unpolarized light incident thereon efficiently. A disadvantage of such polarizers is that they do not perform well enough to be used as such in LCD displays used for monitors or television sets. This is particularly the case in the blue range of the visible spectrum. By including a thin-film polarizer of a type in accordance with the invention wherein the dichroic guest is a blue colorant the performance of the lyotropic liquid crystalline dye based polarizer is substantially improved. Being non-polymeric, the lyotropic liquid crystalline dye-based polarizer is mechanically not very robust and is sensitive to organic solvents and water and thus is easily damaged during manufacture or use of an LCD comprising such polarizer. The oriented polymer film brings the additional advantage of protecting the vulnerable lyotropic liquid crystalline dye-based polarizer.

The polarizer may be used for any type of application where polarized light beams are required but is particularly suited for use in liquid crystal displays. Therefore, a particular embodiment of the polarizer in accordance with the invention constitutes a liquid crystal cell comprising a substrate, a liquid crystal layer and a guest-host polarizer in accordance with the invention.

The polarizer may be, as is conventional for the H-sheet polarizer, provided on the outside of a liquid crystal cell. Since the polarizer in accordance with the invention is not sensitive to moisture unlike the H sheet polarizer a protective layer need not be provided. Further, unlike the H sheet polarizer an adhesive layer can be dispensed with as it can be directly coated onto a substrate of the LC cell. Lacking an adhesive and a protection layer the polarizer in accordance with the invention is much thinner than the conventional H sheet polarizer when applied on the outside of the LC cell.

Because the polarizer in accordance with the invention can be very thin it may also be provided on the inside of the liquid crystal cell, such arrangement is in the art referred to as an "in-cell polarizer".

Accordingly, in a preferred embodiment, the guest-host polarizer is arranged between the liquid crystal layer and the substrate. Advantageously, further optical layers are included between the liquid crystal layer and the substrate such as a compensation layer, a retarder layer, a color filter layer or a viewing-angle improvement layer. The term "substrate" in this context means any layer providing a substantial contribution to the mechanical robustness of the structure of which it is a part and includes for example the substrate formed in situ from a (known) stratified-phase-separable composition.

The oriented polymer films for use in the polarizer in accordance with the invention have uses other than the polarizer in particular if the oriented polymer film is thin. Other applications include retarders, reflective color filters and anti-reflective coatings. Thin oriented polymer films can be conveniently manufactured using polymerizable liquid crystals because such liquid crystals have, relative to polymers, a low molecular weight rendering them processable by means of conventional thin-film forming methods.

In another aspect, the invention relates to a polymerizable liquid crystal for use in the manufacture of an oriented film, such use including but not being limited to the use in the manufacture of a dichroic guest-host polarizer film in accordance with the invention.

In accordance with the invention, the polymerizable liquid crystal is a polymerizable liquid crystal for use in the manufacture of an oriented polymer film, the polymerizable liquid crystal having a smectic phase $S_X$ where X is not A or C, with the exception of trans-1-[4-[6-(acryloyloxy)hexyloxy]cyclohexanecarboxyl]-4-[4-[6-(acryloyloxy)hexyloxy]benzoyloxy]benzene.

The term "polymerizable liquid crystal" includes "polymerizable liquid composition" or more particular "polymerizable liquid crystal mixture.

The use of the polymerizable liquid crystal entails, providing a thin film comprising the polymerizable liquid crystal, orienting the thin film and polymerizing the thin film while (substantially) maintaining the orientation to obtain the oriented film. The inventors have found smectic phases to be particularly in providing oriented films having a high order. Typically, thin films of polymerized liquid crystal having an order of about 0.91 or higher have routinely been obtained. Order parameters of about 0.92 or higher or even about 0.93 or higher can also be achieved. An order parameter of about 0.94 or higher is possible.

Particularly suitable for use in oriented polymer films, is the smectic phase B or tilted variants thereof, that is the smectic F and I phase. In the context of the present invention, and in accordance with the classification of mesophases used in some prior art references, "soft crystal" phases are also considered smectic phases. In particular, crystal B and its tilted versions, crystal G and J, and crystal E and, tilted versions thereof, that is crystal H and K, can also be used for the polarizers. The suitable mesophases have in common the presence of a long-range orientational order.

Nematic phases are generally less suitable as they provide dichroic ratios of about 8 or less. Smectic A phases generally provide a dichroic ratio of less than 12. The smectic C phase, is a tilted variant of the smectic A phase and thus also generally unsuitable. Moreover, generally, tilt in directions which make an angle with the plane of transmission and extinction axis adversely affects the dichroic ratio.

In Lub et al. Recl. Trav. Chim. Pays-Bas, 115 321-328 (1996) the compound trans-1-[4-[6-(acryloyloxy)hexyloxy]cyclohexanecarboxyl]-4-[4-[6-(acryloyloxy)hexyloxy]benzoyloxy]benzene is disclosed. Lub et al further disclose that this compound exhibits an unknown smectic phase $S_X$. The inventors of the present invention have now established that the unknown smectic phase is a $S_B$ phase. In hindsight, it thus appears that the compound is suitable for use in the manufacture of an oriented polymer film, more in particular a highly oriented film. Note, however, Lub et al are concerned with providing polymerizable liquid crystals which have improved stability against UV light. It is in this context that the compound is prepared. No mention is made of highly ordered oriented films let alone of polarizers comprising such films. Lub et al further disclose the compound all-trans-1,4-bis-[4-[6-(acryloyloxy)hexyloxy]cyclohexanecarboxy]]cyclohexane. Although according to Lub et al this compound exhibits a smectic X phase the compound can, further according to Lub et al, not be aligned due to its high viscosity. Because the capability of being oriented is essential to the suitability of use for the manufacture of oriented polymer films, this compound is not in accordance with the invention.

In a particular embodiment, the polymerizable liquid crystal exhibits on the high temperature side of the smectic X phase with X is not A or C, a smectic A phase. Having a smectic A phase in addition to the smectic X phase where X is not A or C makes it easier and better to align leading to improved dichroic ratios. In a further embodiment the polymerizable liquid crystal comprises alternatively or in addition a nematic phase.

A particular embodiment of the polymerizable liquid crystal in accordance with the invention is one wherein, the polymerizable liquid crystal is one of the formula I $$U—V—W—X—Y—X'—Y'—X''—W'—V'—U' \quad (I)$$

wherein

X, X' and X" are each, independently of one another, Ph or Cy;

where Ph is a 1,4-phenylene unit and Cy is a trans 1,4-cyclohexylene unit;

Y, Y' are each, independent of one another, —CH$_2$CH$_2$—, —CH$_2$O— or —OCH$_2$—, —COO—, —COO—, - - -, —N═N—, —C═N—; U, U' are each, independent of one another, a polymerizable group or U is a polymerizable group and U'═H or U═H and U' is a polymerizable group;

V, V' are each, independent of one another, a spacer; and

W, W' are each, independent of one another, a direct bond, —O—, —S—, —COO—, or —COO—; with the proviso that if X, X' and X" are each Ph then Y' is —CH2CH2-, —CH2O— or —OCH2- and/or at least of one X, X' or X" is Ph.

The inventors have found the compounds of formula (I) to be a rich source of polymerizable liquid crystals exhibiting a smectic phase suitable for use in the manufacture of an oriented, more particular a highly oriented polymer film.

Preferred is a polymerizable liquid crystal wherein X is Ph, X' is Ph and X" is Cy or X is Ph, X' is Cy and X" is Ph.

Also, preferred is a polymerizable liquid crystal wherein X, X' and X" are each, independently of one another, Ph and Y' is —CH$_2$CH$_2$—, —CH$_2$O— or —OCH$_2$—.

The Chemical Abstracts' abstract (abstract number AN 1997: 12560) of a publication by Kurihara and co-workers in Macromolecules 1997, 30, 313-315 discloses a representative of the class of polymerizable liquid crystals in accordance with this embodiment. However, inspection of the publication itself reveals that the structure in the abstract is erroneous as the publication itself does not disclose such representative.

The polymerizable liquid crystal is to be formulated in a thin film forming composition. Such composition typically comprises further compounds such as a polymerization initiator, a photo-initiator, an polymerization inhibitor, a preservative and a surfactant for adjusting the tilt angle of the polymerizable crystal at a surface when a thin film is formed a such surface. Typically, in order to get high degree of order tilt angle should be low. Surfactant for providing low tilt angles are known in the art as such.

In a further aspect, the invention relates to an oriented polymer film including a polymerized liquid crystal obtainable by polymerizing an oriented polymerizable liquid crystal in accordance with the invention or trans-1-[4-[6-(acryloyloxy)hexyloxy]cyclohexanecarboxyl]-4-[4-[6-(acryloyloxy)hexyloxy]benzoyloxy]benzene. The film may also obtained from the thin film composition referred to above.

The invention also relates to a method of manufacturing a guest-host polarizer comprising an oriented polymer film including an oriented polymerized liquid crystal host and a dichroic light-absorbing guest dispersed and oriented in the host, the oriented polymer film having a dichroic ratio of about 15 or more, the method comprising:

providing a thin film of a polymerizable liquid crystal host and, dispersed therein, a dichroic light-absorbing guest;

orienting the polymerizable liquid crystal host and the dichroic light-absorbing guest to obtain an oriented thin film of oriented polymerizable liquid crystal host and a dichroic light-absorbing guest dispersed and oriented in the host, the oriented thin film having a dichroic ratio of about 15 or more;

polymerizing the polymerizable liquid crystal host in the oriented state to obtain an oriented polymer film including an oriented polymerized liquid crystal host and a dichroic light-absorbing guest dispersed and oriented in the host, the oriented polymer film having a dichroic ratio of about 15 or more.

These and other aspects of the invention will be apparent from and elucidated with reference to the drawings and the embodiments described hereinafter.

Figure 1:
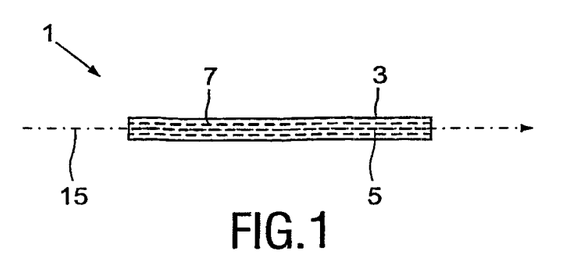
FIG. 1 shows, schematically, a cross-sectional view of a dichroic guest-host polarizer in accordance with the invention.

In FIG. 1, the dichroic guest-host polarizer 1 comprises, or more particularly in the present embodiment, consists of an oriented polymer film 3 including an oriented polymerized liquid crystal host 5 and a dichroic light-absorbing guest 7 which is dispersed and aligned with the host 5.

The dichroic light-absorbing guest 7 is dispersed in the form of distinct dichroic light-absorbing bodies. In general a dichroic light-absorbing body may be an individual molecule (a dichroic dye), an aggregate or a network of such molecules or an inorganic (nano)particle (a pigment). The optical absorption of an individual dichroic light-absorbing body is directionally dependent; along one body axis light absorption is at a maximum along another, typically perpendicular to the body axis of high absorption, a body axis where light absorption is at a minimum, typically substantially zero.

The polymerized liquid crystal is anisotropically oriented providing a long-range orientational order. The individual dichroic light-absorbing bodies of the guest 7 are aligned with the host 5 thus providing the oriented polymer film 3 with directionally dependent light absorption properties and thus with the ability to polarize light.

As schematically indicated in FIG. 1, the dichroic bodies of the guest 7 have an oblong shape and are planar uniaxially oriented in the oriented polymer film 3. This is by no means essential. Other shapes, such as a disk-shape and orientations, such as homeotropic or biaxial orientation, may be used as well.

The orientation of the guest 7 shown in FIG. 1 provides a polarizer having an extinction axis 15 which is aligned with the axis of the planar uniaxial orientation.

The polymerized liquid crystal host 5 facilitates the orientation of the dichroic host 7 to the extent that the oriented film 3 has a dichroic ratio of about 15 or more. In the context of the present invention, dichroic ratio (DR) means dichroic ratio in absorbance and is defined as the ratio of the absorbance (measured at normal incidence) along the extinction axis and the absorbance along the transmission axis where absorbance (A) is defined as $A=-\log_{10}T$ where T is transmission. The dichroic ratio does not depend on thickness of the oriented polymer film neither does it depend on the dichroic guest concentration. Since any absorption along the extinction and transmission axis normally originates from the same optical transition, the dichroic ratio is substantially independent of wavelength.

Typically, the oriented polymer film has a dichroic ratio of about 15 or more at a wavelength in the visible range of 400 to 700 nm. Advantageously, the dichroic ratio is about 30 or more across the visible range. Preferably, the dichroic ratio is substantially constant across the visible range. To obtain a color neutral polarizer the absorbance of the dichroic guest is to substantially constant across the wavelength of interest which will generally be the visible range of 400 to 700 nm.

Having a dichroic ratio of about 20 or 25 or more is better. A dichroic ratio of about 30 or even about 35 or more is preferred when the polarizer is for use in an LCD monitor. For use in an LCD TV, a dichroic ratio of about 40 or even 45 or more is selected. Having such dichroic ratios available allows very thin polarizers to be made which are suitable for use in LCDs in particular LCD monitors and LCD TVs.

The thin-film polarizer in accordance with the invention can be manufactured in a wide range of thicknesses. Because the polarizer can be manufactured using thin-film forming methods such as doctor blading or spin-coating or printing the polarizer can be made thin to very thin. For example, it can easily be obtained with a thickness less than that of the conventional H-sheet polarizer, for example a thickness of about 50 μm or any number less than that. The thickness can also be about 30 μm or any lesser number or more particularly about 10 μm or any lesser number. Preferably, the thickness is about 5 μm or any lesser number. A practical lower limit on the thickness is about 100 to 300 nm. (Assuming molar absorption coefficient of about $10^5$ cm$^{-1}$ mol$^{-1}$ and a dichroic guest loading of 10 wt %.

Because the dichroic ratio of the oriented polymer film is very high, and the polymerized liquid crystal host allows uptake of a considerable amount of a dichroic guest which has high extinction coefficient, highly absorbing polarizers can be provided which are very thin and have a polarization selectivity and brightness meeting the requirements of most LCD applications.

When the thin-film polarizer is very thin it may be convenient to include a substrate (not shown in FIG. 1) to support and reduce the risk of rupturing the film during manufacture and/or use. Such a substrate can be made of any kind of material or have any type of composite structure. Depending on the contemplated use of the polarizer, the substrate may be transparent or reflective.

The polarizer in accordance with the invention may be used for any application for which known polarizers have been used. For example, the thin-film polarizer may be suitably used in an LCD. When applied for use in an LCD, a substrate of the LCD can be conveniently used to support the polarizer. In an advantageous embodiment, the polarizer is provided on the inside of the liquid crystal cell as shown in FIG. 2.

Figure 2:
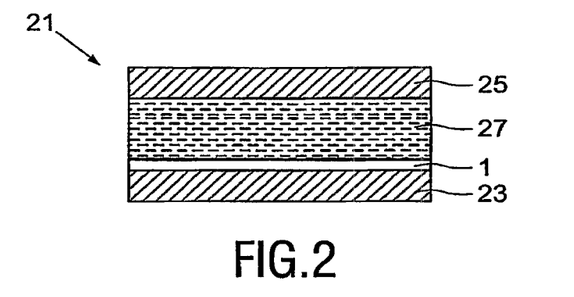
FIG. 2 shows, schematically, a cross-sectional view of a liquid crystal cell having an in-cell polarizer.

In FIG. 2 a conventional liquid crystal cell 21 is shown which has two substrates, 23 and 25, which sandwich a liquid crystal layer 27. On a side of the substrate 23 facing the liquid crystal layer 27, a dichroic guest-host polarizer 1 in accordance with the invention is accommodated. For reasons of simplicity, other components required to obtain a fully functional LC cell such as alignment layers, electrode layers and the like are not shown.

Figure 6:
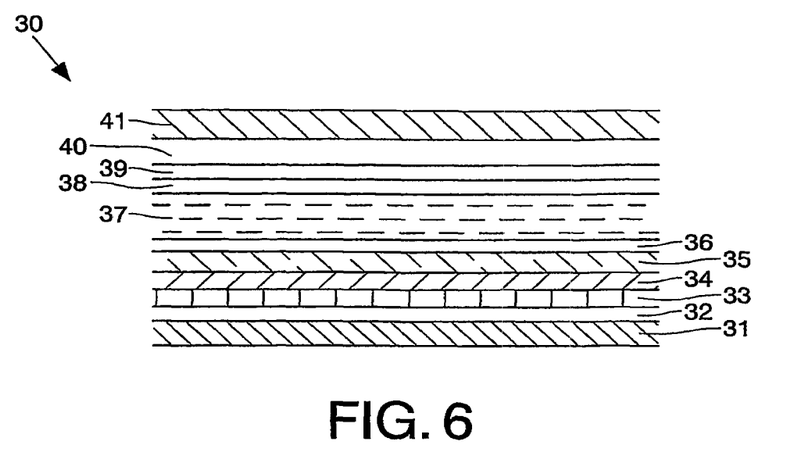
FIG. 6 shows schematically a cross-sectional view of a transmissive active matrix color liquid crystal display device having an in-cell polarizers.

FIG. 6 shows schematically a cross-sectional view of a transmissive active matrix color liquid crystal display device having an in-cell polarizers. The display device 30 comprises a layer stack of a substrate 31, a first polarizer in accordance with the invention 32, a color filter 33, a planarization layer 34, a common ITO electrode layer 35, a first orientation layer 36, a liquid crystal layer 37, a second orientation layer 38, a second polarizer in accordance with the invention 39, a TFT layer 40 comprising thin-film transistor circuitry and pixel electrodes and a substrate 41.

The first polarizer 32 may alternatively be located on the other side of substrate 31 or between the color filter 33 and the planarization layer 34 or better between the planarization layer 34 and the ITO layer 35. Locating the polarizer between the ITO layer 35 and the orientation layer 36 is possible but increases the drive voltage.
otr When provided in the position shown the polarizer could increase the driving voltage of the display. However this effect can be countered if the polarizer replaces the black matrix layer normally provided between the orientation layer and the TFT layer to protect the TFT layer. The second polarizer 39 may alternatively be located on the other side of the substrate 41 or between the substrate 41 and the TFT layer 40.

Having the first and/or second polarizer on the inside of the display allows compensation layers, viewing angle films and retarders layers to be accommodated inside the liquid crystal cell as well, more specifically, inbetween such polarizer and the liquid crystal layer 37.

Figure 7:
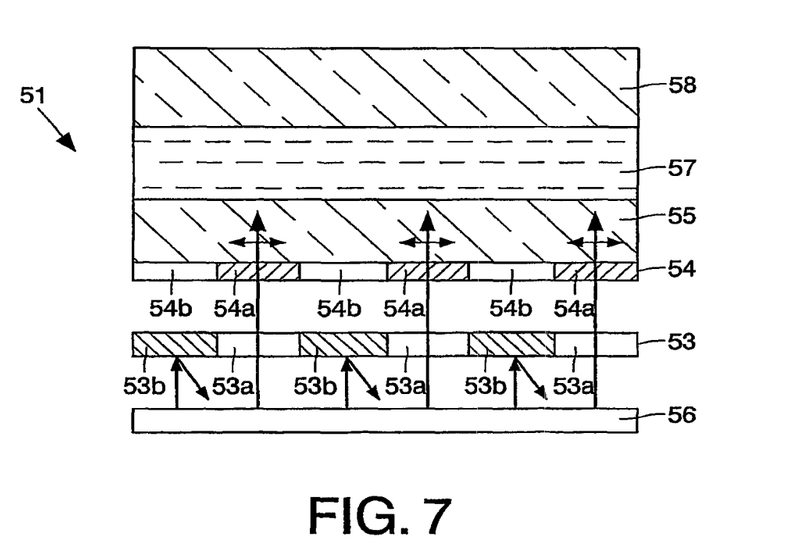
FIG. 7 shows schematically a cross-sectional view of a transflective display having a patterned polarizer in accordance with the invention.

FIG. 7 shows schematically a cross-sectional view of a transflective display having a patterned polarizer in accordance with the invention.

The transflective display 51 shown in FIG. 7 has a liquid crystal cell comprising a liquid crystal layer 57 dispersed between substrates 55 and 58. When operated in transmission the backlight system 56 illuminates the cell via a transflector 53. The transflector 53 has light transmissive regions 53a, which may take the form of holes, and light reflective regions 53b. On the outside of substrate 55a patterned polarizer in accordance with the invention 54 is provided. It has polarizing regions 54a and non-polarizing regions 54b. The non-polarizing regions 54b are laid out to correspond with the light-reflective regions 53b and the polarizing regions 54a correspond to the light-transmissive regions 53a. In operation, light emitted by the backlight system 56 may directly pass through a light-transmissive region 54a and offered to the liquid crystal layer 57 or reflect off a light reflective region one or more times before eventually passing through a light transmissive region 53a. During this process no light loss by polarization occurs because polarization is done after the light has passed the transflector 53. This is in contrast to conventional transflective displays in which a non-patterned polarizer is arranged between the transflector and the backlight system. Needless to say, the patterned polarizer 54 may alternatively be arranged on the other side of substrate 55 or even on the transflector 53.

In order to provide an oriented polymer film which has a dichroic ratio of about 15 or more, the dichroic guest and thus the polymerized liquid crystal host must be highly oriented. The extent of orientation may be expressed in terms of the order parameter S where S is, in the context of the present invention defined as S=(DR−1)/(DR+2) and DR is the dichroic ratio (assuming order parameter $$S = \langle P_2(\cos\Theta) \rangle = \left(\frac{3}{2}\cos^2\Theta\frac{1}{2}\right)$$

and the transition dipole moment of the dichroic dye oriented along the long axis of the molecules). According to this formula, a dichroic ratio of about 15 corresponds to an S of 0.823 an DR of about 35, corresponds to an S of 0.919, whereas a dichroic ratio of 50 corresponds to an S of 0.942.

To provide the high degree of order required, the inventors have found the use of smectic phases to be useful. This is surprising because the type of order required for high dichroic ratios is orientational order. Smectic phases however are first and foremost known for their high positional order compared to nematic phases. The inventors have generally found the degree of order typically provided by smectic A phases to be too low. The smectic C phase is generally not suitable. Generally, nematic phases also have a degree of order which is too low to provide the dichroic ratios of the present invention. Suitable mesophases include smectic B or tilted variants thereof, that is the smectic F and I phase, crystal B and its tilted versions, crystal G and J, and crystal E and tilted versions thereof, that is crystal H and K. The suitable mesophases have in common the presence of a long-range orientational order.

Oriented polymer films with or without dichroic guests, more particular polarizers comprising such oriented films may be formed of liquid crystal polymers having a smectic phase $S_X$ (X is not A and C) may be used to manufacture the highly oriented films. Such polymers are linear main chain or side chain polymers which may or may not be cross-linked after having been deposited in the form of the film. The polarizer in accordance with the invention is a specific embodiment of such an oriented film. Other applications of such oriented films include retarders and bifocal lenses.

Preferred oriented polymer films are those comprising a polymerized liquid crystal which is obtained by polymerizing in oriented polymerizable liquid crystal. Preferably, polymerizable liquid crystals having a smectic phase $S_X$ (X is not A and C) polymerized in that phase are used.

In particular, polymerizable liquid crystals of the formula (I) may be used in the manufacture of oriented films.

U—V—W—X—Y—X'—Y'—X''—W'—V'—U'  (I)

wherein

X, X' and X'' are each, independently of one another, Ph or Cy;

where Ph is a 1,4-phenylene unit and Cy is a trans 1,4-cyclohexylene unit;

Y, Y' are each, independent of one another, —CH2CH2-, —CH2O— or —OCH2-, —COO—, —COO—, —N=N—, —C=C, —C=N—;

U, U' are each, independent of one another, a polymerizable group or U is a polymerizable group and U'=H or U=H and U' is a polymerizable group;

V, V' are each, independent of one another, a spacer; and

W, W' are each, independent of one another, a direct bond, —O—, —S—, —COO—, or —COO—;

with the proviso that if X, X' and X" are each Ph then Y' is —CH2CH2-, —CH2O— or —OCH2-; and/or at least one of X, X' or X" is Ph.

Preferably, X, X' and X" are each Ph and Y' is —CH2CH2-, —CH2O— or —OCH2-. Also preferred is X and X' are each Ph and X" is Cy, and X and X" are each Ph and X' is Cy.

The unit Ph is an unsubstituted 1,4-phenylene or substituted 1,4-phenylene substituted with more than one, but preferably with one substituent. The one or more substituents are each, independently of one another, selected from the group consisting of methyl, CN, F, Cl and Br. In addition, or alternatively, one or more of the CH groups of the 1,4-phenylene unit may be replaced with N. A preferred Ph unit is unsubstituted 1,4-phenylene.

The unit Cy is an unsubstituted trans 1,4-cyclohexylene or substituted trans 1,4-cyclohexylene substituted with more than one but preferably with one substituent. The one or more substituents are each, independently of one another, selected from the group consisting of methyl, CN, F, Cl and Br. Optionally one or more CH2 groups are, each, independently of one another, replaced with —O— or —S— or NR where R is a C1-C6 alkyl or phenyl. Optionally, the carbon atom in 1 and or 4-position is replaced with N.

Preferably, the units U, U' are photo-polymerizable groups. Particular examples of U and U' include $CH_2=CH-$, $CH_2=CCl-$, $CH_2=C(CH_3)-$ or 4-vinyl phenylyl. Preferred groups U and U' include (meth)acrylate, vinylether, oxetane, epoxy, or a thiolene system. Preferred is U=U'. When U=U' the polymer obtained is crosslinked. Typically, mixtures of polymerizable liquid crystals will be used, for example a mixture of a compound with U=U' and a compound where U=H.

V, V' are each, independent of one another, a spacer, the spacer may be of a conventional structure such as $C_1$-$C_{20}$ alkyl groups which may be interrupted with one or more —O—, —S—, NH or $NH_3$ units. Preferred are $C_2$-$C_{12}$ alkyl groups or more preferably $C_6$-$C_{10}$, optionally interrupted in the manner above. The spacer may have one or more substituents such as F, Cl, Br, CN, $CH_3$ but preferably has none.

Needless to say, to tune the properties of oriented films a mixture of polymerizable liquid crystals will generally be used of which at least one or more or all components are a compound of formula (I).

More specifically, polymerizable liquid crystals are of the formula II, III, or IV may be used.

(II)

(III)

(IV)

where U, U', V, V', W, W', Y and Y' have the meaning defined above and Y" is —$CH_2CH_2$—, —$CH_2O$— or —$OCH_2$—.

The compounds of formula I to III can be synthesized by means of methods disclosed analogous to those disclosed in Lub et al. Recl. Trav. Chim. Pays-Bas, 115 321-328 (1996).

Suitable dichroic light-absorbing guests include inorganic pigments having dichroic pigments particles dispersed throughout the host. Organic dichroic compounds may also be used. The dichroic molecules of such compound may be dispersed on a molecular scale or may be present in the form of aggregates or networks. Dichroic azo dyes are in particular suited to be used as guest. Examples of suitable dichroic dyes include those disclosed in U.S. Pat. No. 6,133,973.

Specific examples of suitable dichroic dye guests include the azo dyes

Y may be different or the same as Y'.

W, W' are each, independent of one another, a direct bond, —O—, —S—, —COO—, or —COO— but preferably a direct bond or —O—.

Typically, the polarizer will comprise a plurality of dichroic guests to obtain the desired absorption properties in terms of active wavelength range and absorbance within such range.

In addition to absorbing light, the dichroic guest may be luminescent, such as fluorescent, electroluminescent or phosphorescent.

The dichroic guests may be liquid crystalline per se but this is not essential; typically they will not be. The dichroic guest may be non-reactive or may be provided with one or more polymerizable groups. The latter is advantageous if the dichroic guest migrates through the host and migration is to be avoided.

The amount of dichroic guest relative to the host will depend on the application and on how much guest the host can tolerate before the high order properties are lost or on how much can be dissolved without precipitation. Typically, the amount is less than 50 wt % or more particular about 20 wt % or less, or preferably, about 10 wt % or less.

The quantity of dichroic guest which can be accommodated in the host can be increased if the mesogenic group of the polymerized liquid crystal includes or is part of a chromophore which can absorb light in the wavelength range in which the polarizer is to be active which will generally be the visible range of the spectrum. Although in such a case the distinction between guest and host becomes somewhat blurred, in the context of the invention such systems are considered guest-host systems. Light absorption (in the visible range of the spectrum) is generally improved if the mesogenic group includes one or more groups selected from —N═N—, —C═C—, —C═N— or —C≡C—. In the polymerizable liquid crystals of formula (I), light absorption is attained if Y and Y' are the same or different —N═N—, —C═C—, —C═N— or —C≡C— and adjacent such group X and/or X' and/or X" is Ph, more particular, X and X' or X' and X" or X' and X' and X" are the same or different Ph with Ph as defined above. The oriented polymer film and in particular the polarizer in accordance with the invention comprising such oriented film can be conveniently manufactured using conventional thin-film forming methods.

One method of manufacturing an oriented polymer, a method as such conventional in the art, comprises: forming a thin film of a liquid crystal polymer, if a dichroic guest-host polarizer is to be obtained, adding a dichroic light-absorbing guest to the liquid crystal polymer; bringing the liquid crystal polymer, optionally containing the dichroic guest, above its clearing temperature and then, while employing orientation means, cooling down the liquid crystal polymer to the temperature to reach the desired mesophase.

To widen the temperature range within the desired orientation is maintained, the oriented liquid crystal polymer may be (slightly) crosslinked after having been brought into the desired mesophase.

Another method comprises:

providing a thin film of a polymerizable liquid crystal host and, dispersed therein, a dichroic light-absorbing guest;

orienting the polymerizable liquid crystal host and the dichroic light-absorbing guest to obtain an oriented thin film of oriented polymerizable liquid crystal host and a dichroic light-absorbing guest dispersed and oriented in the host, the oriented thin film having a dichroic ratio of about 15 or more;

polymerizing the polymerizable liquid crystal host in the oriented state to obtain an oriented polymer film including an oriented polymerized liquid crystal host and a dichroic light-absorbing guest dispersed and oriented in the host, the oriented polymer film having a dichroic ratio of about 15 or more.

The thin film may be provided by conventional thin film forming methods such as coating or printing methods. Suitable coating methods include spin-coating, doctor blading, and spray coating and dip coating and casting. Suitable printing methods are ink-jet printing, screen printing, and offset printing If needed, the composition used to form the thin film may include agents to promote thin film formation such as solvents, adhesion promoters, wetting agents, viscosity modifiers and the like. When deposited on a surface the tilt angle which polymerizable liquid crystal adopts at such surface is to be low if a good polarization contact is to be achieved. In order to lower the tilt angle surfactant such as a nonionic fluoroalkoxylate (as described in EP 940707) can be added.

A method of manufacturing the polarizer in accordance with the invention comprises providing a substrate with a first orientation layer and spacers; positioning a second substrate carrying a second orientation layer on top of the first substrate in such a way that the orientation layers are facing each other in a parallel or anti-parallel fashion. The gap between the two substrates maintained by the spacers is then filled with a mixture containing the polymerizable liquid crystal host and the dichroic light-absorbing guest. The polymerizable liquid crystal host is polymerized in the oriented state. The first or second but preferably not both of the orientation layers contains polymerizable groups capable of copolymerizing with the polymerizable crystal during polymerization thereof. During polymerisation of the polymerisable host, covalent bonds are formed between the so functionalized orientation layer and the polymerized liquid crystalline host. After polymerization, the two substrates are taken apart. As a result of the covalent bonds between the polarizer layer and the functionalized orientation layer the polarizer layer will adhere strongly to the functionalized orientation layer and less strongly to the other which makes the removal of the latter from the polarizer layer without damaging the polarizer layer convenient.

The polymerizable liquid crystal may be crosslinkable which generally is the case when the polymerizable liquid crystal has two or more polymerizable groups.

Orientation of the thin film may be brought about by conventional means such as electric or magnetic fields or mechanical means such as shear-induced orientation. Preferably, an orientation layer is used to orient the liquid crystal (polymer). Conventional orientation layers such as a rubbed polyimide or obliquely sputtered silicondioxide layer may be used.

Using photo-alignment, an orientation means known in the art as such, patterned orientation layers can be obtained. Patterned orientation layers may be used to obtain patterned oriented films in general and polarizers in particular. The patterned polarizer may comprise polarizing regions and non-polarizing regions laid out in a desired pattern and polarizing regions adapted to polarize light along a first direction and regions adapted to polarize light along a second direction, the second direction being different from the first, or any combination thereof.

Polymerization is effected by conventional means, such as by means of temperature or actinic radiation in particular e-beam or UV light. Although not essential, a photo-initiator is preferably used to start and control the polymerization.

A pattered polarizer can be obtained by patternwise polymerization. Polymerization may be performed patternwise by patternwise irradiating a photo-polymerizable film and then for example remove the remaining non-polymerized material in the non-irradiated areas.

The polymerization is carried out such that the orientation is substantially maintained. Typically, dependent on the polymerizable liquid crystal and dichroic guest employed, upon polymerization the degree of order is reduced somewhat.

Polymerizable liquid crystals for use in the method have been disclosed hereinabove.

EXAMPLE 1

Not in Accordance with the Invention

A polymerizable liquid crystal of the following structure is synthesized using a known method.

Phase transitions of the liquid crystal are Cr 115° C. N 155° C. I, where Cr means Crystal, N nematic and I isotropic.

A thin-film polarizer including as host the polymerizable liquid crystal 1 is manufactured as follows:

A liquid crystal cell having two opposed substrates spaced to provide a cell gap of 5 μm and the facing sides of which are provided with a rubbed polyimide orientation layer (rubbing is anti-parallel) is filled with a homogenous mixture of 97 wt % polymerizable liquid crystal host 1, 2 wt % dichroic light-absorbing guest in the form of azo dye NKX2029C, 0.9 wt % photoinitiator IRG 184 (Ciba Geigy) and 0.1 wt % of the inhibitor p-methoxyphenol thus obtaining an oriented polymer film comprising oriented polymerizable liquid crystal host and dispersed therein the dichroic light absorbing guest which is about 5 μm thick.

The oriented liquid crystal film is then subjected to UV radiation for a time sufficient to polymerize the liquid crystal resulting in an oriented polymer film having polarizing properties.

Polarization-selective absorption spectra are measured along the extinction and transmission axis. The dichroic ratio is then determined at the wavelength at which the high absorption spectrum has its highest absorption. The dichroic ratio thus determined is about 8.

The experiment is repeated with polymerizable liquid crystal of formula 2.

The phase transitions are Cr 73° C. $S_A$ 132° C. N 145° C. I, where $S_A$ means smectic A. Lacking a smectic X phase where X is not A and C the compound 2 is not in accordance with the invention.

The dichroic ratio of the polarizer manufactured using this polymerizable liquid crystal host is about 12.

Having dichroic ratios this low renders the thin-film polarizers not in accordance with the invention. The hosts 1 and 2 are not capable of orienting the dichroic dye sufficiently to obtain a polarizer in accordance with the invention.

EXAMPLE 2

In Accordance with the Invention

The polymerizable liquid crystal 3 is synthesized as described in Lub et al. Recl. Trav. Chim. Pays-Bas, 115 321-328 (1996)

The phase transition of the polymerizable liquid crystal 3 are Cr 62° C. $S_B$ 66° C. $S_A$ 109° C. N 127° C. I. At room temperature it takes one or more days before crystallization occurs. The smectic B phase is identified by X-ray analysis.

A liquid crystal cell having two opposed substrates spaced to provide a cell gap of 5 μm and of which the facing sides are provided with a rubbed polyimide orientation layer is filled with a homogenous mixture of 97 wt % polymerizable liquid crystal host 3, 2 wt % dichroic light-absorbing guest in the form of azo dye NKX2029C, 0.9 wt % photoinitiator IRG 184 (Ciba Geigy), and 0.1 wt % of inhibitor p-methoxyphenol.

The cell is heated to a temperature of about 130° C., which is a temperature above the clearing temperature of the compound 3. At this temperature, polarization-selective absorption spectra are recorded (measurement beam is at normal incidence) along two different, mutually perpendicular directions.

Figure 3:
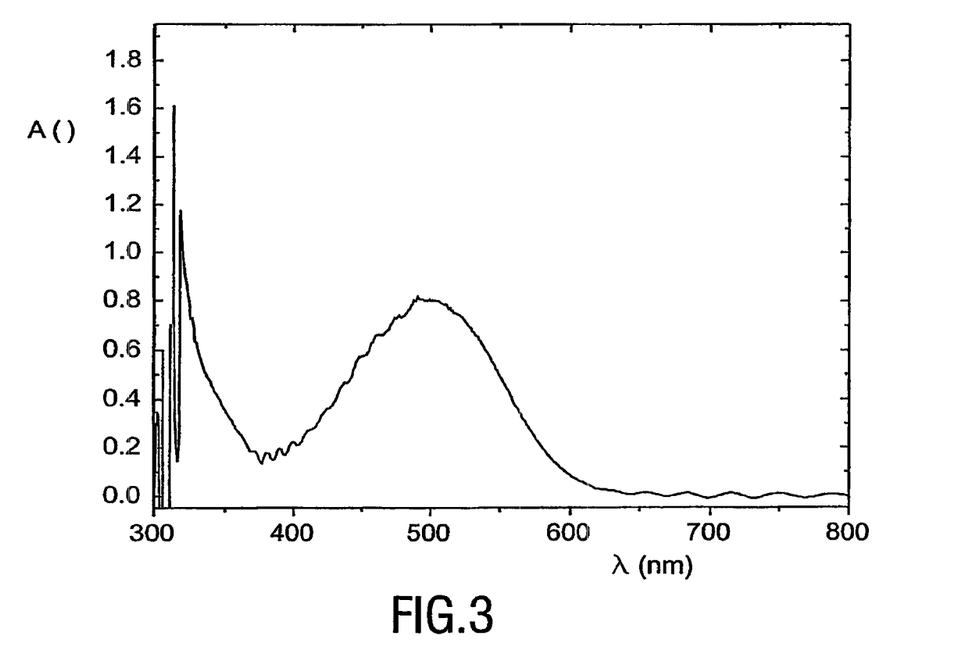
FIG. 3 shows polarization-selective absorption spectra taken along two different, mutual perpendicular directions, and at a stage of manufacturing a dichroic guest-host polarizer in accordance with the invention, plotted as the absorbance A (in dimensionless units) as a function of wavelength λ (in nm)

FIG. 3 shows polarization-selective absorption spectra taken along two different, mutual perpendicular directions, and at a stage of manufacturing a dichroic guest-host polarizer in accordance with the invention, plotted as the absorbance A (in dimensionless units) as a function of wavelength λ (in nm).

The two spectra are essentially coincident indicating that at his stage the film is not oriented.

The cell is then cooled down to room temperature to bring the polymerizable guest-host system into the smectic B phase (confirmed by X-ray analysis) and polarization-selective absorption spectra are recorded along directions at which the absorption is at a maximum and at a minimum.

Figure 4:
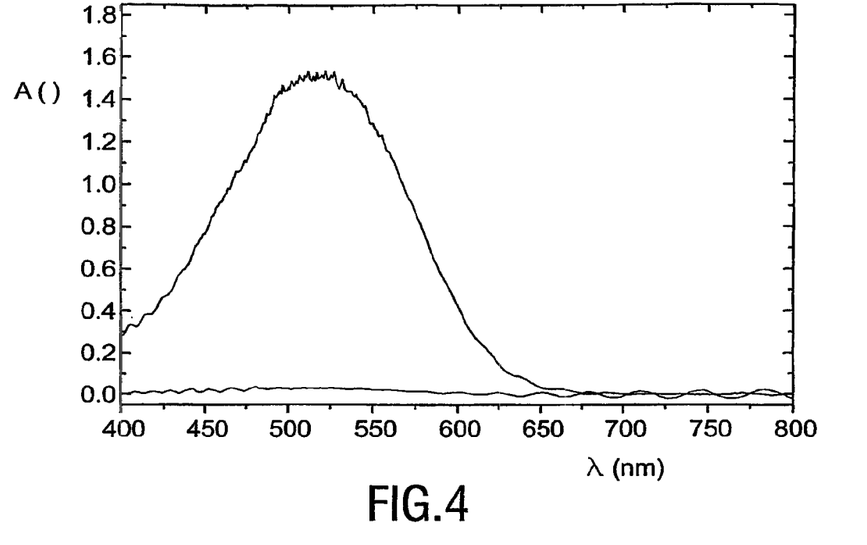
FIG. 4 shows polarization-selective absorption spectra taken along the extinction axis and the transmission axis at a further stage of a method of manufacturing a dichroic guest-host polarizer in accordance with the invention, plotted in terms of the absorbance A (in dimensionless units) as a function of wavelength λ (in nm)

FIG. 4 shows polarization-selective absorption spectra, taken along the extinction axis and the transmission axis at a further stage of a method of manufacturing a guest-host polarizer in accordance with the invention, plotted in terms of the absorbance A (in dimensionless units) as a function of wavelength λ (in nm).

At the wavelength where absorption of the high absorption curve is at a maximum, the dichroic ratio DR is determined to be about 50.

The thin film of polymerizable material is then subjected to UV radiation for a time sufficient to polymerize the material resulting in a polymer film which is as evidenced by polarization selective absorption is oriented.

Figure 5:
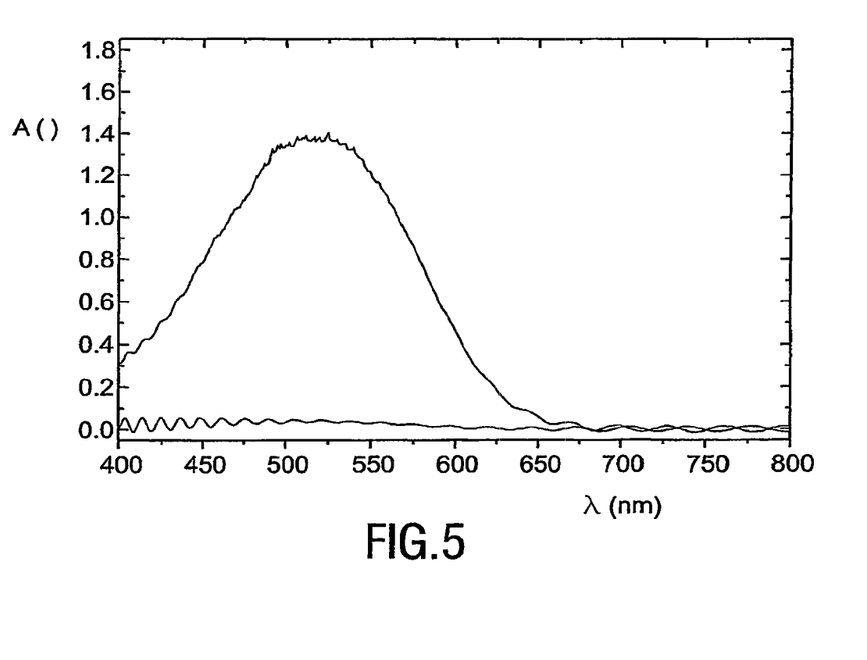
FIG. 5 shows polarization-selective absorption spectra taken along the extinction axis and the transmission axis respectively of an embodiment of a dichroic guest-host polarizer in accordance with the invention, plotted in terms of the absorbance A (in dimensionless units) as a function of wavelength λ (in nm)

FIG. 5 shows polarization-selective absorption spectra of the thin film thus obtained.

Although the absorption along the extinction axis is, compared to that of the polymerizable film, somewhat lower, indicating that the degree of order after polymerization is somewhat lower, an effect which is quite normal to observe, high and low absorbance spectra are clearly distinguishable. At the wavelength where absorption of the high-absorption curve is at a maximum, the dichroic ratio DR is determined to be about 35.

Using a method analogous to the method of synthesis of compound 3 the polymerizable liquid crystal 4 is prepared.

The phase transitions of the compound 4 are Cr 57° C. $S_X$ 63° C. $S_A$ 117° C. N 151° C. I. At room temperature it takes one or more days for crystallization to set in from the smectic phase $S_X$. Thus polymerization in the $S_X$ phase can be effected at room temperature.

By repeating the experiment an oriented film comprising polymerizable liquid crystal host 4 and the dichroic guest NKX2029C is formed. The oriented film is in smectic $S_X$ phase. The dichroic ratio of this oriented liquid crystal film about is 64. After polymerization an oriented polymer film is obtained comprising polymerized liquid crystal host in which the dichroic guest is dispersed and oriented providing the oriented polymer film with polarizing properties. The polymerization is carried out at room temperature. At this temperature the smectic X phase is undercooled.

The dichroic ratio after polymerization is about 52.

Using a method analogous to the method of synthesis of compound 3 the polymerizable liquid crystal 5 is prepared.

The phase transitions of compound 5 are: ($S_X$ 51° C. $S_A$ 60° C.) Cr 73° C. N 150 I. The smectic phases are placed in brackets because they are only discernible in an undercooled state. At temperatures where the smectic X phase exists crystallization occurs readily making it difficult to orient and polymerize in a controlled manner. Accordingly, polarizers obtained using compound 5, have a relatively low dichroic ratio typically the dichroic ratio is about 18 both before and after polymerization.

Compounds 3a and 4a have a similar chemical structure as compounds 3 and 4 with the difference that the length of the spacers linking the acrylate groups to the mesogenic core of the molecules has increased from 6 carbon atoms in compounds 3 and 4 to 11 carbon atoms in compounds 3a and 4a. Compounds 3a and 4a are prepared using methods analogous to the method of synthesis of compounds 3 and 4.

The phase transitions of the compound 3a are Cr 46° C. $S_X$ 98° C. $S_A$ 112° C. N 114° C. I. At room temperature it takes one or more days for crystallization to set in from the smectic phase $S_X$. Thus polymerization in the $S_X$ phase can be effected at room temperature.

By repeating the experiment an oriented film comprising polymerizable liquid crystal host 3a and the dichroic guest NKX2029C is formed. The oriented film is in the smectic $S_X$ phase. The dichroic ratio of this oriented liquid crystal film about is 65. After polymerization an oriented polymer film is obtained comprising polymerized liquid crystal host in which the dichroic guest is dispersed and oriented providing the oriented polymer film with polarizing properties. The polymerization is carried out at room temperature. At this temperature the smectic X phase is undercooled.

The dichroic ratio after polymerization is about 55.

The phase transitions of the compound 4a are Cr 80° C. $S_X$ 84° C. $S_A$ 123° C. N 138° C. I. At room temperature it takes one or more days for crystallization to set in from the smectic phase $S_X$. Thus polymerization in the $S_X$ phase can be effected at room temperature.

By repeating the experiment an oriented film comprising polymerizable liquid crystal host 4a and the dichroic guest NKX2029C is formed. The oriented film is in the smectic $S_X$ phase. The dichroic ratio of this oriented liquid crystal film about is 76. After polymerization an oriented polymer film is obtained comprising polymerized liquid crystal host in which the dichroic guest is dispersed and oriented providing the oriented polymer film with polarizing properties. The polymerization is carried out at room temperature. At this temperature the smectic X phase is undercooled.

The dichroic ratio after polymerization is about 58.

The polymerizable liquid crystals 3, 3a, 4, 4a and 5 have a smectic phase $S_X$ phase with X is not A and not C. Polarizers manufactured using these polymerizable liquid crystals have a dichroic ratio significantly exceeding 15. By for example varying the temperature at which polymerization is performed the dichroic ratio can be varied down to values of about 15 or lower.

EXAMPLE 3

6

The polymerizable liquid crystal (trans)-cyclohexane-1,4-dicarboxylic acid 1-[4-(11-acryloyloxy-undecyl)phenyl]ester 4-(4-hexylphenyl)ester (6) is prepared using the following method:

6

1: Synthesis of 4-(11-hydroxyundecyl)phenol D 0.4 g of CuCl and 29 g of 11-(tetrahydropyran-2-yloxy)-1-bromoundecane (B) were added to a filtered solution of 4-(tetrahydropyran-2-yloxy)phenyl magnesium bromide (A), prepared from 20.0 g of 4-(tetrahydropyran-2-yloxy)-1-bromobenzene and 3.16 g of magnesium, in 100 ml of tetrahydrofuran. After refluxing for 2 days, the reaction mixture was mixed with 100 ml of diethyl ether, followed by extraction with 100 ml of a saturated $NH_4Cl$ solution. After evaporation, the intermediate product C was refluxed for one hour with 40 ml of methanol and 1 ml of saturated hydrochloric acid. 15 ml of a saturated solution of $NaHCO_3$ was added and the methanol was evaporated. 100 ml of diethyl ether was added. 7.4 g of 4-(11-hydroxyundecyl)phenol (D, 36%) was obtained after extraction with 50 ml of saturated sodium chloride, drying over magnesium sulphate, evaporation and recrystallisation from toluene.

2: Synthesis of 4-(11-acryloyloxyundecyl)phenol (G)

2.5 ml of acryloylchloride was added to a solution of 7.4 g of 4-(11-hydroxyundecyl)-phenol (D) and 3.9 ml of N,N-dimethylaniline in 60 ml of tetrahydrofuran, cooled in an ice bath. After stirring for three hours at room temperature, the solution was diluted with 60 ml of diethyl ether and extracted subsequently with 100 ml of water, 100 ml of 2.4 N HCl and 100 ml of a saturated NaCl solution. 4.74 g of 4-(11-acryloyloxyundecyl)phenol (G, 53%) was obtained as a brown powder after drying over magnesium sulphate, evaporating and washing with ligroin.

3: Synthesis of cyclohexane-1,4-dicarboxylic acid 1-[4-(11-acryloyloxy-undecyl)phenyl]ester 4-(4-hexylphenyl)ester (6)

2.5 g of N,N'-dicyclohexyl carbodiimide was added to a mixture of 2.0 g of 4-(11-acryloyloxyundecyl)phenol (G), 1.1 g of hexylphenol (E), 1.03 g of trans-cyclohexane-1,4-dicarboxylic acid (F), 0.15 g of 4-N,N-dimethylaminopyridine and 50 ml of dichloromethane, cooled in an ice bath and stirred under a nitrogen atmosphere. The mixture was stirred overnight at room temperature. 0.93 g of cyclohexane-1,4-dicarboxylic acid 1-[4-(11-acryloyloxy-undecyl)phenyl]ester 4-(4-hexylphenyl) ester (6, 25%) was obtained as a white powder after evaporation, and separation by chromatography using silica gel and dichloromethane/petroleum ether 97/3 as eluent.

The phase transitions of compound 6 are: C 65° C. $S_X$ 88° C. $S_A$ 108 N 120 I. At room temperature it takes one or more days for crystallization to set in from the smectic phase $S_X$. Thus polymerization in the $S_X$ phase can be effected at room temperature.

A thin-film polarizer as described in Example 2 is prepared using the method of Example 2 with the difference that as host the polymerizable liquid crystal 6 is used and the temperature at which the polymerization is carried out is about 38° C.

The dichroic ratio of the thin-film polarizer before polymerization, measured at 38° C., is about 65. After polymerization the dichroic ratio is about 49.

Similar results are obtained for the polymerizable liquid crystals 7, 8 and 9.

Compound 7 has phase transitions Cr 59° C. $S_X$ 95° C. $S_A$ 99° C. N 103° C. I.

The polarizer manufactured using the polymerizable liquid crystal 7 when polymerizing at 38° C. has before polymerization a dichroic ratio of about 40 and after polymerization a dichroic ratio of about 21.

Compound 8 has phase transitions Cr 77° C. $S_X$ 91° C. I. Oriented films could not be made using compound 8 because the film crystallized before reaching a high dichroic ratio.

Compound 9 has phase transitions Cr 91° C. $S_X$ 96° C. N 108° C. I. To avoid crystallization polymerization is not carried out at room temperature but at about 60° C. Before polymerization the oriented film has a dichroic ratio of about 40 after polymerization about 12 which number would have been higher if the polymerization could have been carried out at lower temperatures than 60° C.

EXAMPLE 4

Example 2 is repeated with the difference that now the polymerizable liquid crystal: 4-(6-Acryloyloxy-hexyloxy)-benzoic acid 4-{2-[4-(6-acryloyloxy-hexyloxy)-phenyl]-ethyl}-phenyl ester (10) is used.

23

24

Synthesis of 10 is as follows:

1: Synthesis of (E)-4-(6-hydroxyhexyloxy)-4'-(tetrahydropyran-2-yloxy)stilbene (J)

0.23 g of lithium was dissolved in 150 ml of ethanol. Then 6.2 g of 4-(tetrahydropyran-2-yloxy)benzaldehyde (H) was added. The solution was cooled in an ice-water bath and 16.5 g of 4-(6-hydroxyhexyloxy)phenylmethyltriphenylphosphonium bromide (I) was added. After stirring for 2 hours at room temperature, a white precipitate was obtained. 3.34 g of (E)-4-(6-hydroxyhexyloxy)-4'-(tetrahydropyran-2-yloxy)stilbene (J, 31%) was obtained after collection by filtration and two washings with 150 ml of ethanol.

2: Synthesis of 4-{2-[4-(6-Hydroxy-hexyloxy)-phenyl]-ethyl}-phenol (L)

A mixture of 3.3 g of (E)-4-(6-hydroxyhexyloxy)-4'-(tetrahydropyran-2-yloxy)stilbene (C), 0.6 g of palladium hydroxide, 34 ml of cyclohexene and 50 ml of ethanol was refluxed for 16 hours. The cooled mixture was filtered over celite and evaporated. 2.2 g of 4-{2-[4-(6-Hydroxy-hexyloxy)-phenyl]-ethyl}-phenol (L, 86%) was obtained after dissolution in 600 ml of dichloromethane, two extractions with 50 ml of water, drying over magnesium sulphate and evaporation. Apparently, deprotection of (K) had occurred under the reaction conditions.

3: Synthesis of 4-{2-[4-(6-acryloyloxy-hexyloxy)-phenyl]-ethyl}-phenol (N)

0.8 ml of acryloyl chloride was added to a solution of 2.2 g of 4-{2-[4-(6-Hydroxy-hexyloxy)-phenyl]-ethyl}-phenol (L) and 1.23 ml of N,N-dimethylaniline in 20 ml of tetrahydrofuran, cooled in an icebath. The mixture was stirred for 3 hours at room temperature. 40 ml of diethylether was added which was extracted twice with 20 ml of 2.4N hydrochloric acid and once with 20 ml of brine. It was dried over magnesium sulphate and evaporated. 1.65 g of 4-{2-[4-(6-acryloyloxy-hexyloxy)-phenyl]-ethyl}-phenol (N, 64%) was obtained after washing with 15 ml of pentane.

4: Synthesis of 4-(6-Acryloyloxy-hexyloxy)-benzoic acid 4-{2-[4-(6-acryloyloxy-hexyloxy)-phenyl]-ethyl}-phenyl ester (10)

1.01 g of N,N'-dicyclohexyl carbodiimide was added to a mixture of 1.6 g of 4-{2-[4-(6-acryloyloxy-hexyloxy)-phenyl]-ethyl}-phenol (G), 1.43 g of 4-(6-acryloyloxyhexyloxy)benzoic acid, 0.06 g of 4-N,N-dimethylaminopyridine and 10 ml of dichloromethane stirred in an icebath. After stirring for 2 hours, the ice-bath was removed and the mixture was stirred one night at room temperature. 2.3 g of 4-(6-Acryloyloxy-hexyloxy)-benzoic acid 4-{2-[4-(6-acryloyloxy-hexyloxy)-phenyl]-ethyl}-phenyl ester (10, 78%) was obtained after filtration through silica, evaporation and recrystallizing from methanol.

The polymerizable liquid crystal 10 has phase transitions: Cr 72° C. $S_X$ 85° C. $S_A$ 100° C. N 102° C. I.

The thin-film polarizer comprising as host the polymerizable liquid crystal 10 has, before polymerization, a dichroic ratio of about 43. The thin-film polarizer obtained after polymerization has a dichroic ratio of about 30.

Similar results are obtained with the following compounds or mixtures of these compounds:

and

The invention claimed is:

1. A polymerizable liquid crystal for use in the manufacture of an oriented polymer film, the polymerizable liquid crystal having a smectic phase $S_X$ where X is B, wherein the polymerizable liquid crystal is selected from the group consisting of:

and

2. A polymerizable liquid crystal thin film forming composition comprising a polymerizable liquid crystal as claimed in claim 1, and at least one of a polymerization initiator, a photo-initiator, a polymerization inhibitor, a preservative and a surfactant for adjusting the tilt angle adopted by the polymerizable crystal at a surface when a thin film is formed on such surface.

3. An oriented polymer film including a polymerized liquid crystal obtainable by polymerizing an oriented polymerizable liquid crystal as claimed in claim 1.

* * * * *